Figure 1:
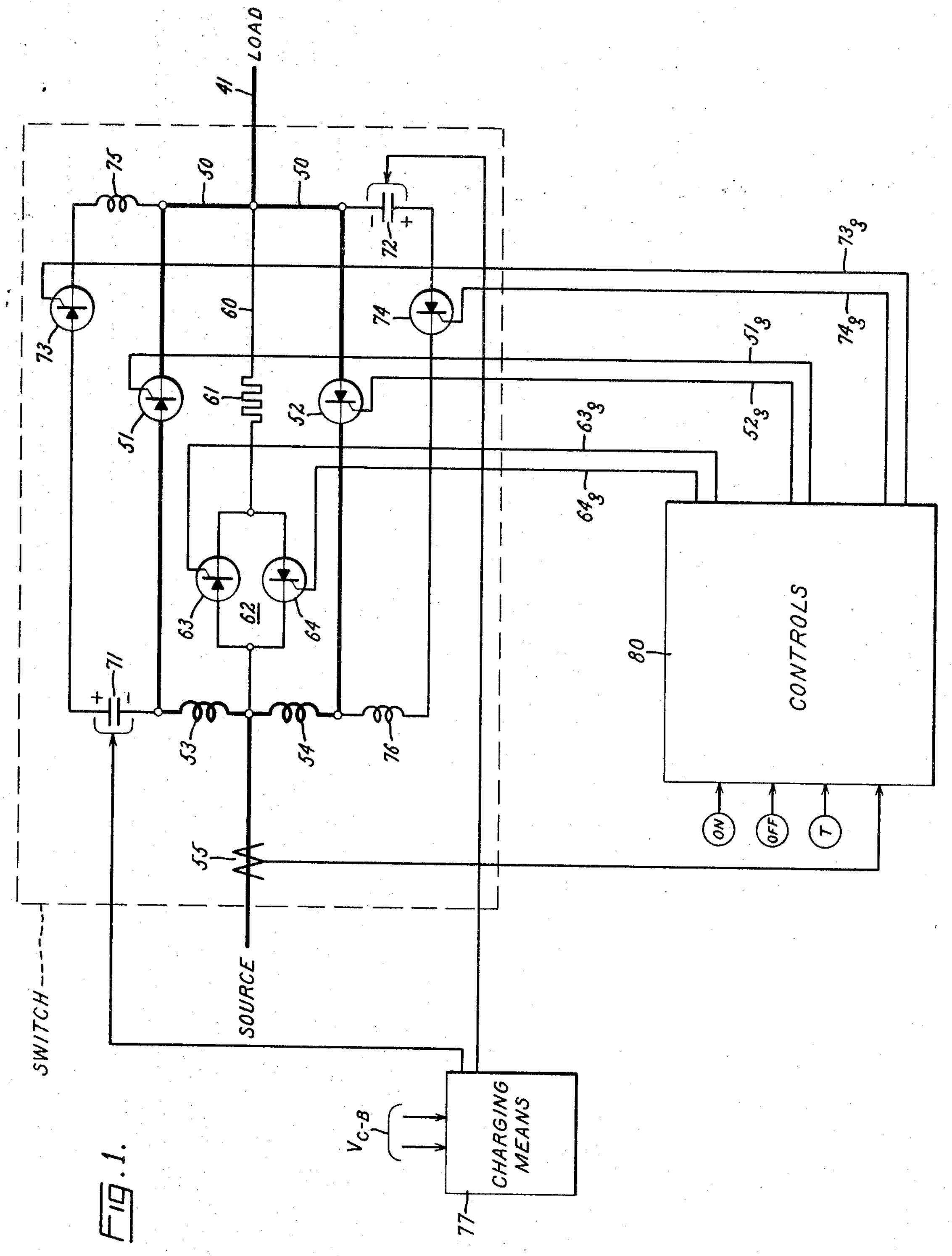

United States Patent

[11] 3,558,982

[72] Inventor Allan N. Greenwood
Media, Pa.
[21] Appl. No. 733,150
[22] Filed May 29, 1968
[45] Patented Jan. 26, 1971
[73] Assignee General Electric Company
a corporation of New York

[54] CURRENT LIMITING PROTECTIVE MEANS
12 Claims, 2 Drawing Figs.

[52] U.S. Cl. .......... 317/20, 317/23, 317/33, 321/14, 323/24
[51] Int. Cl. .......... H02h 3/08, H02h 7/14
[50] Field of Search .......... 323/24, (Inquired); 317/23, 11, 33SCR, 20, (Inquired); 321/14, (Inquired)

[56] References Cited
UNITED STATES PATENTS

| | | | |
|---|---|---|---|
| 3,098,949 | 7/1963 | Goldberg .......... | 307/252X |
| 3,369,154 | 2/1968 | Swain .......... | 317/33X |
| 3,401,303 | 9/1968 | Walker .......... | 317/11 |

*Primary Examiner*—James D. Trammell
*Attorneys*—J. Wesley Haubner, Albert S. Richardson, Jr., Barry Stein, Frank L. Neuhauser, Oscar B. Waddell and Joseph B. Forman

ABSTRACT: A high-speed AC electric power switch and current-limiting impedance combination suitable for interconnecting a static inverter and its load circuit is arranged to respond to an overload condition by inserting the impedance in series with the load so fast that the inverter can remain in service with its integrity unimpaired. The switch is also arranged to subsequently isolate the load circuit from the inverter in the event that the overload condition has not otherwise been relieved within a predetermined length of time.

INVENTOR:
ALLAN N. GREENWOOD,
BY Albert S. Richardson Jr.
ATTORNEY

INVENTOR:
ALLAN N. GREENWOOD,
BY Albert S. Richardson, Jr.
ATTORNEY

CURRENT LIMITING PROTECTIVE MEANS

This invention relates to means for protecting electric power distribution systems and circuits, and more particularly it relates to a high-speed overcurrent protector for improving power continuity.

In the art of electric power distribution and protection, it is becoming increasingly important to minimize adverse effects of any abnormal condition in the source of power, in the distribution system itself, or in the electric loads supplied thereby, so that critical loads can continue operating with the least possible disturbance. Reliable power can be essential for loads such as computers, for example, where even a transient dip in voltage, or a momentary loss of power, can result in serious errors or malfunctions in the utilization equipment and an extended outage could be intolerable. Consequently, to improve the quality and continuity of electricity supplied to such loads, electrical manufacturers have made available "uninterruptible power systems," sometimes referred to as no-break power supplies, for installation between the incoming power lines and the load. Such apparatus typically comprises one or more combinations of rectifying, energy-storing, and inverting sections so arranged as to faithfully energize a critical bus with highly stable AC power regardless of disturbances in, or failure of, utility power.

In practice a plurality of load or feeder circuits are often connected in parallel to a common critical bus, and such feeders include suitable protective devices (e.g., fuses) for automatically isolating an individual feeder circuit in the event of a fault involving solely that branch of the system. During the period of time normally required to isolate or clear such a fault selectively, it is important to preserve the integrity of the inverter so that when the branch fault is cleared the critical bus is not lost but continues to supply the remaining loads. On the other hand, if it should happen that the branch fault were not cleared, or that the critical bus itself were faulted, it is important to remove the inverter from service before serious damage is caused to the apparatus. Accordingly, my general objective is to provide improved protective means for accomplishing these ends.

A further objective of my invention is the provision, for a variety of useful purposes, of protective means characterized by the ability to react instantly to abnormal circuit conditions, to preserve service continuity where possible, and to completely isolate a load circuit when necessary.

In its high speed of response, its ability to isolate when necessary, its sensitivity, and its versatility in general my invention differs significantly from the teachings of U.S. Pat. No. 3,323,017 to Powell et al.

In carrying out my invention in one form, a first pair of inverse parallel load-current conducting thyristors is shunted by the series combination of a current-limiting resistor and a second pair of inverse parallel, relatively light-duty thyristors. Commutating means is provided for high-speed turnoff of the first pair of thyristors when a slight overload is detected, whereupon through current is forced to traverse the current-limiting resistor which limits its magnitude while preserving service continuity. A short time later the second pair of thyristors is turned off by discontinuing their firing signals to open the circuit completely unless the overload has previously subsided (due, for example, to the blowing of branch fuses).

Figure 2:
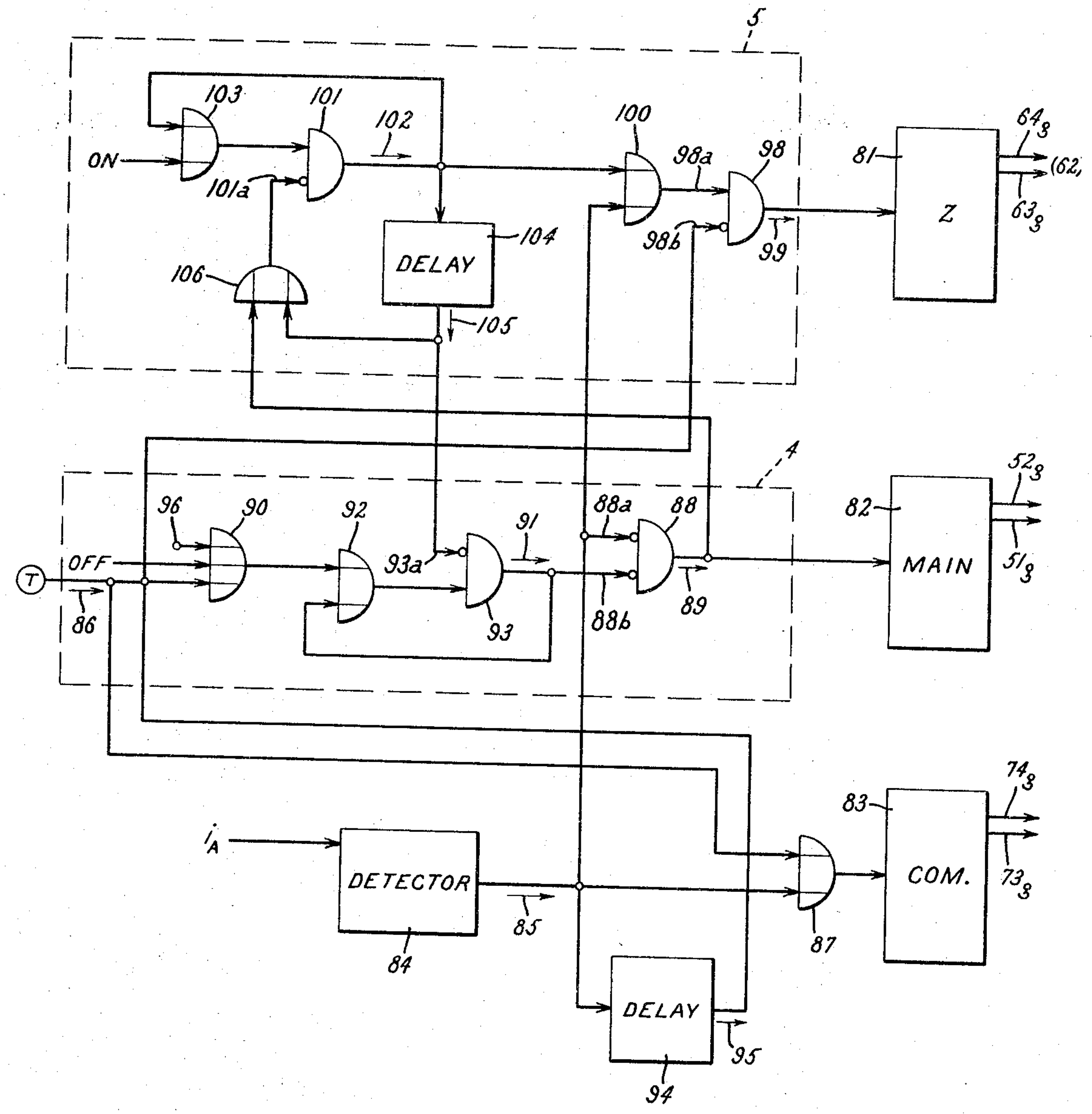

My invention will be better understood and its various objects and advantages will be more fully appreciated from the following description taken in conjunction with the accompanying drawings in which:

FIG. 1 is a schematic diagram of a single-phase version of my improved protective means; and FIG. 2 is a functional block diagram of a preferred embodiment of the controls shown as a single block in FIG. 1.

In FIG. 1 the power circuit of the protective means has been shown inside a broken-line box labeled "switch," and the associated controls are shown generally as a block 80. Further details of the controls are illustrated in FIG. 2 which will be described later. Certain novel features of the switch and its controls described but not claimed herein are the invention of F. L. Steen, for which see his copending patent application Ser. No. 738,611, filed on June 20, 1968, assigned to the General Electric Company.

The switch illustrated in FIG. 1 is adapted to be serially connected in a load current conducting path 41 between an electric power source and a load circuit. In a three-wire, three-phase AC system, a total of three duplicate switches would be used in practice, all three sharing common controls 80.

The load circuit typically comprises a bus having a plurality of separately protected feeder circuits or branches (not shown). Alternatively, the source could be a power distribution bus, and the load circuit a feeder individually protected by my switch. Thus the switch is useful in a variety of settings, and it is particularly advantageous in an uninterruptible power system such as the one referred to briefly in the introduction of this specification and explained more fully in copending U.S. application Ser. No. 733,446 filed on May 31, 1968, U.S. Pat. No. 3,530,360 for A. E. Relation and assigned to the General Electric Company.

In the switch there is a main circuit 50 comprising load current conducting solid-state-controlled switching means, and the main circuit is shunted by a subsidiary circuit 60 comprising the combination of another switching means in series with current limiting impedance means 61. The solid-state-controlled switching means of the main circuit 50 is normally maintained in a relatively low resistance, turned-on state, whereby load current can easily traverse the switch. Preferably this switching means comprises first and second semiconductor controlled rectifiers 51 and 52 disposed in inverse parallel relationship with one another as shown. Such devices are known generally as thyristors, and more information about them can be obtained from published literature such as the reference book SEMICONDUCTOR CONTROLLED RECTIFIERS by F. E. Gentry et al. (Prentice-Hall Inc. Englewood Cliffs, N.J., 1964). The main thyristors 51 and 52 are turned on (triggered) by means of suitable firing signals supplied thereto from the associated controls 80 via connections **51*g* and 52*g***, respectively.

If desired for higher current and voltage ratings of the switch, duplicate devices can be connected in parallel and series and operated in unison with the thyristors 51 and 51, respectively. The main thyristors are selected to safely conduct their respective shares of full load current continuously.

Preferably the main circuit 50 of the switch also includes a pair of decoupling inductors 53 and 54 which are respectively connected in series with the thyristors 51 and 52. The inductor 53 is located between the anode of thyristor 51 and the source end of the switch, and the inductor 54 is located between the cathode of thyristor 52 and the same end of the switch.

The switching means 62 in the subsidiary circuit 60 of the switch can be either an electromechanical contact or a solid-state-controlled switching means which preferably exhibits bidirectionally conducting capability. As is shown in FIG. 1, it comprises a pair of thyristors 63 and 64 connected in inverse parallel relationship with one another. The on/off states of these thyristors are controlled by firing signals respectively supplied thereto from the controls 80 via connections **63*g* and 64*g*. Since the thyristors 63, 64 are in series with the current limiting impedance means 61 (preferably a resistor), and since they are not required to conduct for more than a predetermined limited length of time (see below), they can have an appreciably lower thermal rating (and hence smaller size and lower cost) than the thyristors in the main circuit 50. Preferably the resistance value of the resistor 61 is selected to limit the current that can traverse the switch, when the main thyristors 51 and 52** are both turned off and when the whole load is short circuited, to a magnitude approximately equal to 100 percent normal full load current.

To sense the magnitude of current in the load current path 41, the illustrated switch includes a current transformer 55 which supplies a proportional input signal to the controls 80. The controls are designed to initiate an extremely fast transfer of through current from the main circuit 50 to the subsidiary circuit 60 in immediate response to the occurrence of any condition that causes abnormally high current in the main circuit, as reflected by the current transformer 55. If the resulting transfer is quick enough, the resistor 61 can impede any appreciable rise in current above the pickup level and will in fact limit current to its 100 percent value, whereby the supply apparatus (e.g., a static inverter) can continue operating without shutdown or damage and service continuity is at least temporarily preserved.

In order to accomplish this result, the switch includes means, operative when commanded by the controls 80, for immediately forcing the main thyristors 51, 52 to change abruptly from their low resistance, turned-on states to high resistance, turned-off states. Such action requires that anode current in any conducting thyristor be quenched and its firing signal be discontinued (suppressed) without waiting for the next natural current zero. To quench current in a conducting thyristor, suitable commutating means is connected to the main thyristors 51 and 52.

The commutating means, which can take a variety of forms well known in the art, preferably comprises first and second capacitor-thyristor circuits respectively connected in parallel with the main thyristors 51 and 52 to divert current from the latter when the corresponding commutating thyristor is triggered, whereby both of the main thyristors can immediately assume a high resistance, essentially nonconducting state. Thus, as is clearly shown in FIG. 1, the series combination of a power capacitor 71, a commutating thyristor 73, and a small reactor 75 is connected across the main thyristor 51, and a similar combination of a power capacitor 72 in series with a commutating thyristor 74 and a small reactor 76 is connected across the main thyristor 52. In accordance with the teachings of U.S. Pat. No. 3,098,949 to Goldberg, each of the power capacitors 71 and 72 is precharged to a suitable DC level by suitable charging means 77 which is energized by source voltage $V_{C-B}$. The relative polarity of the charge on each capacitor has been indicated on FIG. 1. The commutating thyristors 73 and 74 are triggered by firing signals supplied thereto from the controls 80 via connections 73*g* and 74*g*, respectively.

Although omitted in the drawings, it will be understood the conventional snubber circuits would ordinarily be connected in parallel with each of the thyristors shown in FIG. 1 to limit the rate of voltage rise across the thyristor when turning off.

Before proceeding with a description of FIG. 2, the various operating modes of the switch shown in FIG. 1 will now be summarized. Normally the thyristors 51, 52 in the main circuit 50 are turned on and alternating current freely traverses the same. The controls 80 are arranged to respond immediately to a condition of abnormally high current in the switch by supplying firing pulses to the commutating thyristors 73, 74. As a result, overcurrent is commutated from whichever main thyristor was conducting to the power capacitor in parallel therewith, and both of the main thyristors 51, 52 are quickly turned off. Substantially simultaneously the firing signals for the main thyristors are suppressed, which can be done either in automatic response to the commutating action or, as disclosed herein, by suitably programming the controls 80. At the same time the switching means 62 in the subsidiary circuit is turned on, whereby the current-limiting resistor 61 is effectively connected in parallel with the main circuit 50. As soon as the capacitor in the commutating circuit discharges and current through the commutating thyristor oscillates to zero, the latter reverts to its high resistance, turned-off state and current, flowing through the switch, is forced to traverse the current-limiting resistor 61. The time required to detect the overcurrent condition and to complete the impedance inserting action is measured in microseconds.

The controls 80 are also arranged to suppress the firing signals for the switching means 62 in series with the current limiting resistor 61 in response to the abnormally high current condition continuing for a predetermined length of time (e.g., 3 seconds), thereby causing the switching means 62 to turn off and interrupt current through the resistor 61. Consequently the load circuit can be completely isolated from the power source. However, if prior to the expiration of this interval of time a downstream fuse blows, or the fault is otherwise cleared, so that the abnormally high current condition terminates, the switch will automatically return to its normal state. Termination of the abnormal condition is indicated by current in the load path 41 subsiding to a predetermined "-drop-out" value which may, for example, be 50 percent of the pickup level. This subsidence of current is sensed by current transformer 55, and the controls 80 respond thereto by restoring the firing signals for the main thyristors 51 and 52 which can then resume their normal low resistance, turned on states.

As will soon be explained in greater detail, the controls 80 are preferably arranged simultaneously to trigger the commutating thyristor 73, 74 and to suppress the firing signals for both the main thyristors 51, 52 and the switching means 62 in high-speed response to the receipt of an externally-imposed tripping signal indicated symbolically in FIG. 1 by the encircled T. Alternatively, the controls 80 will suppress the firing signals for the main thyristors 51, 52, and will not trigger any of the other thyristors in response to a predetermined "off" command.

In order to restart or reclose a turnoff switch, switching means 62 is first triggered, thereby inserting the resistor 61 in series with the load current path 41, and subsequently the main thyristors 51 and 52 are triggered into their conducting states. This operating sequence serves several useful purposes. While the resistor 61 is effective, it limits the magnitude of inrush current to the load circuit, thereby providing a soft start and avoiding unnecessary opening of the switch in response to only a transient overcurrent condition. The delay in triggering the main thyristors 51, 52 provides time for precharging the commutating capacitor 71 and 72, and if there is a preexisting load fault the firing signals for the main thyristors will remain suppressed.

Turning now to FIG. 2, there is shown a functional block diagram of control details that can be used in practicing my invention. In FIG. 2 the blocks 81, 82, and 83, which are labeled "Z," "main," "and "com," respectively, represent firing signal generators for triggering the switching means 62, the main thyristors 51, 52, and the commutating thyristors 73, 74 of the switch shown in FIG. 1. The internal circuits of the respective generators 81, 82, and 83 can be conventional (e.g., see chapters 5 and 7 of the above-cited Gentry et al. reference book), and there is therefore no need to disclose them in detail herein.

The generator 83 is operative to produce one short (e.g., 20 mircoseconds) pulselike firing signal for each of the commutating thyristors 73, 74 when triggered by an impedance inserting command for a from an overcurrent detector 84. The input signal to the detector 84, which is noted in FIG. 2 as $i_A$ and is derived from the previously mentioned current transformer 55, is proportional to the value of current actually flowing through the FIG. 1 switch. In a three-phase application, the detector would additionally be supplied with corresponding inputs from the other two phases. In either case the detector 84 is designed to produce an output signal 85 in substantially instantaneous response to any input signal attaining a preset pickup level which represents a predetermined value of overcurrent in the load circuit supplied by the switch (e.g., 125 percent rated full load current). The detector 84 will then sustain its output signal 85 until load current subsequently subsides to another, lower predetermined value (e.g., 50 percent of the pickup value), whereupon the impedance inserting command terminates. The leading edge of the signal 85 triggers the firing signal generator 83.

Alternatively, the generator 83 may be activated by an opening command in the form of an externally imposed tripping signal 86. Therefore the two signals 85 and 86 are fed to the generator 83 via a conventional OR logic circuit 87. The generator 83 will produce firing signals for substantially simultaneously turning on both commutating thyristors 73, 74 in high-speed response to the issuance of either command. Turning on the commutating thyristors immediately commutates off whichever main thyristor 51, 52 is then conducting. Where desired, additional control circuitry (not shown) could be used to provide selective triggering of the two thyristors 73 and 74, whereby only the one associated with the then conducting main thyristor is triggered upon operation of the generator 83.

The main firing signal generator 82 is operative when enabled to produce suitable firing signals for triggering both of the main thyristors 51 and 52. It is controlled by logic means 4 so arranged that the generator 82 is normally enabled, whereby the main thyristors 51 and 52 are normally maintained in their turned on states. The logic symbol shown at 88 represents an AND function having two NOT inputs 88*a* and 88*b*. So long as there is no signal applied to either of these inputs, the logic component 88 will provide an output signal 89 that enables the generator 82 to operate. The output signal 89 is suppressed, thereby disabling the generator 82 and consequently suppressing the firing signals for the main thyristors 51, 52, in immediate response to an input signal at either 88*a* or 88*b*. The input 88*a* for the logic component 88 is energized by the output signal 85 from the overcurrent detector 84, whereby the generator 82 stops triggering the main thyristors at the same time the commutating thyristors are triggered by the impedance inserting command. The generator 82 will remain disabled and the main thyristors 51, 52 will remain off so long as the signal 85 subsists.

The other input 88*b* for the component 88 is energized by a signal 91 that is produced whenever anyone of a plurality of alternative input pulses is supplied to an OR unit 90. In accordance with the above-cited Steen application, once the signal 91 appears it is maintained until the controls 80 are subsequently reset by a deliberate closing command. In FIG. 2 this latching function is shown symbolically by an OR component 92 and an AND component 93. When the unit 90 receives an input pulse, the AND component 93 produces the signal 91 and seals itself in until subsequently released by energization of its NOT input 93*a*.

Four possible inputs to the OR unit 90 are indicated in FIG. 2. One is derived in delayed response to the operation of the overcurrent detector 84 by means of a timing circuit 94. The timing circuit 94 is designed to produce an output signal 95 when activated continuously by the signal 85 for a predetermined length of time (e.g., 3 seconds). The delayed signal 95 causes the second disabling signal 91 to appear, after which the main generator 82 will remain disabled even though the signal 85 is discontinued. It will now be apparent that whenever the overload condition terminates before the aforesaid time interval expires, both the overcurrent detector 84 and the timing circuit 94 will immediately reset and no signal 95 will be produced, and in response to the termination of the overcurrent signal 85, the enabling signal 89 automatically returns to enable the generator 82 to resume triggering the main thyristors 51, 52.

Other inputs for the OR unit 90 are derived from the tripping signal 86, or from manually operated means indicated by the legend "off," or from any desired automatic inhibiting condition that results in a signal being applied to a terminal 96.

The block 81 in FIG. 2 represents suitable means for controlling the conductive state of the switching means 62 that is connected in series with the current limiting resistor 61 of the FIG. 1 switch. The means 81 is operative when active to produce an appropriate signal for turning on or closing the switching means. Where inverse parallel thyristors 63 and 64 are used, it can comprise a firing signal generator similar to the one shown at 82 for triggering the main thyristors. The generator 81 is itself controlled by logic means 5 preferably arranged to render it normally inactive, whereby the subsidiary thyristors 63 and 64 are normally maintained in their turned off states. This is accomplished by means of the AND logic component 98 having one regular input 98*a* one NOT input 98*b*. Unless a signal is applied to the first input 98*a* and none to the second input 98*b*, no output signal 99 is provided by the component 98 and operation of the generator 81 is prevented or blocked.

The input 98*a* for the logic component 98 is energized via an OR logic circuit 100 by the output signal 85 from the overcurrent detector 84, whereby the generator 81 is activated and starts triggering the switching means 62 at the same time the commutating thyristors 73 and 74 are triggered by the impedance inserting command. Alternatively, the input 98*a* may be energized by a signal 102 that is produced by a logic component 101 on receipt of a switch closing command from means indicated by the legend "on." In any event, the output signal 99 of the logic component 98 is suppressed, thereby affirmatively deactivating the generator 81 and suppressing the firing signals for the switching means 62, whenever a signal is applied to its input 98*b*. The latter input is energized in response to issuance of an opening command corresponding to the appearance of either the output signal 95 of the timing circuit 94 (indicating that the impedance inserting command has continued to subsist for at least 3 seconds) or the tripping signal 86. When none of the thyristors is triggered, the switch is in its open circuit condition.

To close the switch, a closing command is issued to the AND component 101 which immediately produces the signal 102 and latches in as is indicated symbolically at 103 in FIG. 2. The signal 102 unblocks the firing signal generator 81 which starts triggering the switching means 62 in series with the current limiting resistor 61 in the subsidiary circuit 60 of the switch. Simultaneously it activates a timing circuit 104 which a short time later (e.g., 0.2 second) produces an output signal 105. The signal 105 energizes the NOT input 93*a* of the logic component 93 to release or unlatch the latter, whereupon the signal 91 terminates, the signal 89 reappears, and the main firing signal generator 82 is again enabled. This causes the main thyristors 51, 52 to turn on and "close" the low resistance main circuit 50 of the switch. At the same time, by means of a connection from the output of the timing circuit 104, through an OR circuit 106, to the NOT input 101*a* of the AND logic component 101, the signal 102 is discontinued, whereupon the generator 81 is deactivated and stops triggering the switching means 62. To ensure that the signal 102 will not coexist with the signal 89, the latter is also fed back through the OR circuit 106 to the NOT input 101*a* of the component 101. The advantages of the closing sequence outlined in this paragraph were previously explained.

While the presently preferred form of my invention has been shown and described by way of illustration, many modifications will occur to those skilled in the art. I therefore contemplate by the claims which conclude this specification to cover all such modifications as fall within the true spirit and scope of my invention.

I claim:

1. Overcurrent protective means comprising:

a. a main circuit comprising solid-state-controlled switching means which is normally maintained in a relatively low resistance state whereby electric current can easily traverse said main circuit;

b. means for serially connecting said main circuit in a load current conducting path between a source of electric power and an electric power load circuit;

c. said main circuit being shunted by the combination of another switching means in series with load current limiting impedance means;

d. means operative in immediate response to a condition of abnormally high current in said path for causing said controlled switching means to change from its low resistance, turned on state to a high resistance, turned-off state, whereupon load current is forced to traverse said impedance means; and e. means operative in delayed response to said abnormally high current condition for causing said other switching means to turn off, thereby interrupting current through said impedance means, unless said abnormal condition has earlier terminated.

2. The protective means of claim 1 including means for causing said controlled switching means to resume its normal low resistance state in response to the termination of said abnormal condition prior to the operation of the means for turning off said other switching means.

3. The protective means of claim 1 in which the means for turning off said controlled switching means comprises commutating means for quenching current in said controlled switching means in high-speed response to the occurrence of said abnormally high-current condition.

4. The protective means of claim 3 in which said other switching means comprises additional solid-state-controlled switching means which is turned on by the operation of an associated firing signal generator when said first-mentioned controlled switching means is turned off, and in which the means for turning off said other switching means comprises means for deactivating said generator in response to said abnormally high-current condition continuing for a predetermined length of time.

5. The protective means of claim 1 in which said path conducts alternating current and both of said switching means exhibit bidirectional conducting capabilities.

6. The protective means of claim 5 in which said solid-state control switching means comprises a pair of thyristors connected in inverse parallel relationship with one another.

7. The protective means of claim 6 in which said other switching means comprises an additional pair of thyristors connected in inverse parallel relationship with one another.

8. In combination:

a. a main circuit comprising solid-state-controlled switching means which is normally maintained in a relatively low resistance, turned-on state, whereby electric current can easily traverse said main circuit;

b. means for serially connecting said main circuit in a load current conducting path between a source of electric power and an electric power load circuit;

c. said main circuit being shunted by the combination of another switching means in series with load current limiting impedance means;

d. commutating means operative in high-speed response to a first command for quenching current in said controlled switching means, whereupon said controlled switching means abruptly changes from its low resistance state to a high resistance, turned-off state which forces current to traverse said impedance means; and e. means operative in response to a second command issued after said first command for causing said other switching means to turn off, thereby interrupting current through said impedance means.

9. In combination:

a. a main circuit comprising first solid-state-controlled switching means;

b. first control means operative when enabled for triggering said first switching means which consequently can assume a relatively low resistance, turned-on state whereby electric current can easily traverse said main circuit;

c. said main circuit shunted by the combination of second solid-state-controlled switching means in series with current-limiting impedance means;

d. second control means operative when activated for triggering said second switching means which consequently can assume a relatively low resistance, turned-on state, thereby effectively connecting said impedance means in parallel with said main circuit;

e. means for serially connecting said main circuit in a load current conducting path between a source of electric power and an electric power load circuit;

f. means responsive to a closing command for immediately activating said second control means and for subsequently enabling said first control means;

g. commutating means operative when triggered for quenching current in said first switching means which consequently can assume a high resistance, turned-off state; and h. means responsive to an impedance-inserting command for substantially simultaneously:

i. triggering said commutating means;

ii. activating said second control means; and iii. disabling said first control means.

10. Overcurrent protective means comprising:

a. a main circuit comprising solid-state-controlled switching means which is normally maintained in a relatively low resistance state whereby electric current can easily traverse said main circuit;

b. means for serially connecting said main circuit in a load current conducting path between a source of electric power and an electric power load circuit;

c. said main circuit being shunted by the combination of another switching means in series with load current-limiting impedance means; and d. commutating means connected to said controlled switching means for causing said controlled switching means to change from its low resistance state to a high resistance, essentially nonconductive state, in high-speed response to the occurrence of an abnormally high-current condition, whereupon load current is forced to traverse said impedance means.

11. In combination:

a. a main circuit comprising first solid-state-controlled switching means;

b. first control means operative when enabled for triggering said first switching means which consequently can assume a relatively low resistance, turned-on state whereby electric current can easily traverse said main circuit;

c. said main circuit being shunted by the combination of second solid-state-controlled controlled switching means in series with current-limiting impedance means;

d. second control means operative when activated for triggering said second switching means which consequently can assume a relatively low resistance, turned-on state, thereby effectively connecting said impedance means in parallel with said main circuit;

e. means for serially connecting said main circuit in a load current conducting path between a source of electric power and an electric power load circuit;

f. means responsive to a closing command for immediately activating said second control means and for subsequently enabling said first control means;

g. commutating means operative when triggered for quenching current in said first switching means which consequently can assume a high resistance, turned-off state; and h. means responsive to an impedance-inserting command for substantially simultaneously triggering said commutating means and disabling said first control means, said last-mentioned means being arranged to enable said first control means to resume triggering said first switching means in response to the termination of said impedance-inserting command.

12. The combination set forth in claim 11 including means responsive to an opening command issued while said impedance-inserting command subsists for deactivating said second control means which consequently stops triggering said second switching means.